July 30, 1940.    A. A. BERNDT ET AL    2,209,620
COMPOSITE STRAND CONNECTOR
Filed Nov. 11, 1937
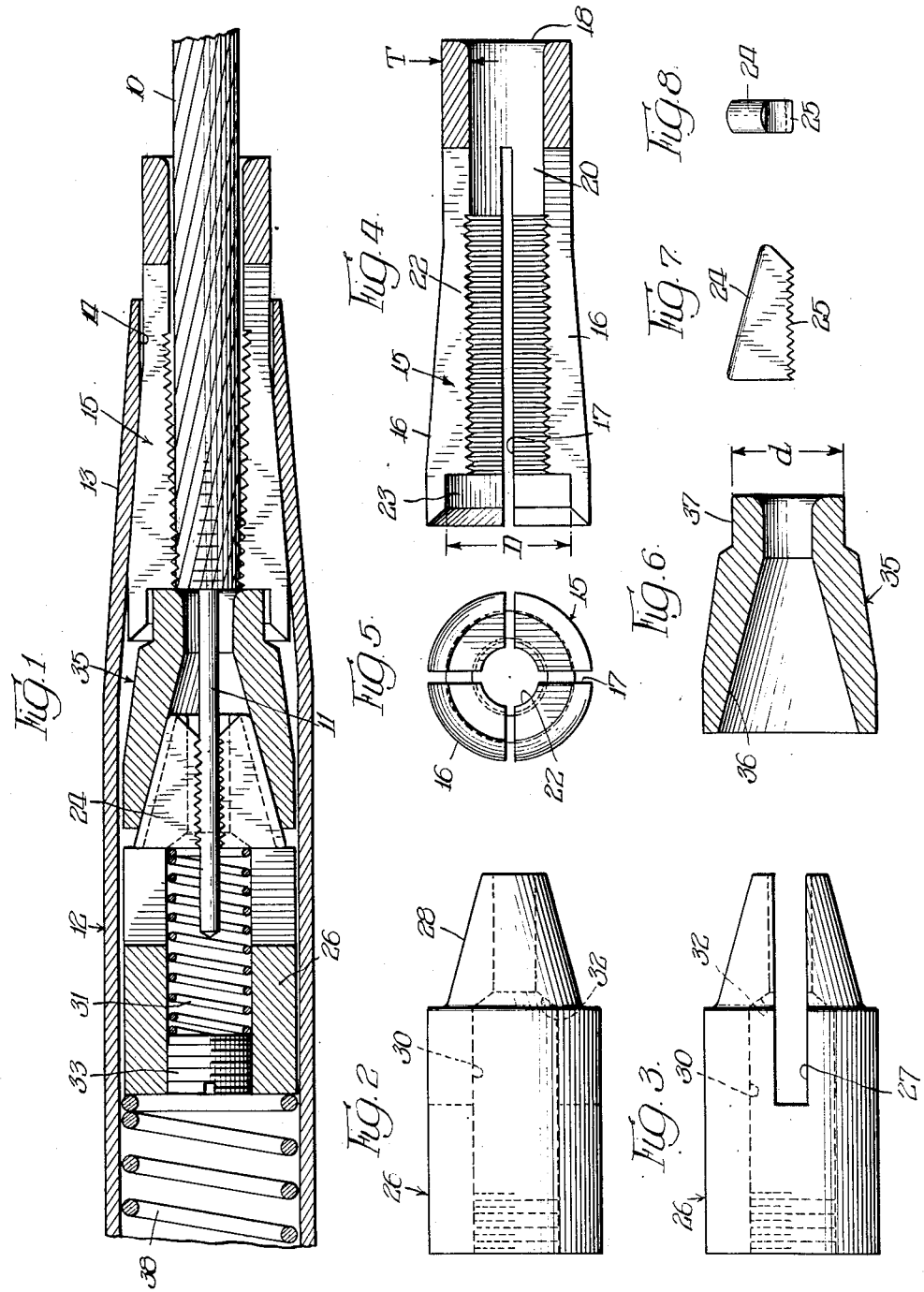
Inventors:
Arthur A. Berndt,
Homer C. Nycum Patented July 30, 1940

2,209,620

UNITED STATES PATENT OFFICE 2,209,620

COMPOSITE STRAND CONNECTOR

Arthur A. Berndt and Homer C. Nycum, Chicago, Ill., assignors to Electroline Company, Chicago, Ill., a corporation of Illinois Application November 11, 1937, Serial No. 174,005

4 Claims. (Cl. 24—81)

The invention relates to improvements in connectors for cable, particularly stranded wire cable used in electrical power transmission.

In certain types of cable for electrical power transmission the outer strands are formed of aluminum or other material of high electrical conductivity, which, however, is relatively low in tensile strength and in order to support the suspension load the center of the cable is composed of one or more wires or strands of steel or other material of high tensile strength. Therefore, in joining a cable of this type to an anchor or in connecting adjacent lengths of such cable the center wire or strand must be securely gripped by the anchor or connector so as to assume most of the load, whereas, the outer wires may be clamped in a manner to assume the minor part of the load and to provide good electrical contact with the connector.

It is an object of the invention to provide a connector which will securely grip and hold the center wire or strand of the cable in a manner to place the greatest tensile strain thereon and which will clamp the outer wires to insure good electrical contact therebetween.

Another object of the invention is to provide a connector having means for gripping and holding the outer wires of the strand and having other gripping means acting conjointly therewith for gripping and securely holding the center steel wire of the strand.

A further object is to provide a connector in which the gripping member acting on the outer wires of the strand will have a delayed gripping action with respect to the members for gripping and securely holding the center steel wire of the strand.

A further object resides in the provision of a connector having a gripping member for engaging the outer wires of the strand and having gripping wedges for securely gripping and holding the center wire of the strand and wherein the gripping action of the member is limited so that the amount of bite and compression applied thereby to the soft outer wires will be held to its most effective value.

Another object is to provide a connector that can be readily joined to a stranded wire cable and which will not require the use of solder or tools.

With these and various other objects in view the invention may consist of certain novel features of construction and operation as will be more fully described and particularly pointed out in the specification, drawing and claims appended hereto.

In the drawing which illustrates an embodiment of the invention and wherein like reference characters are used to designate like parts—

Figure 1 is a longitudinal sectional view taken substantially through the connector constructed in accordance with the present invention;

Figure 2 is a detail view showing in elevation the retainer for the gripping wedges;

Figure 3 is another elevational view of the retainer more clearly showing the slots formed therein;

Figure 4 is a longitudinal sectional view taken substantially through the center of the member for gripping the outer wires of the strand;

Figure 5 is a rear elevational view of the gripping member shown in Figure 4;

Figure 6 is a longitudinal sectional view of the cone, and

Figures 7 and 8 are side and front elevational views respectively of the gripping wedges.

The invention is shown as embodied in a connector for wire strand or cable having outer wires of aluminum or similar material of high electrical conductivity and having a center wire of steel or other high strength material for assuming the major part of the tension placed on the strand when in use. The steel wire of the strand adequately strengthens the same for withstanding the suspension load and therefore in joining a composite strand of this character to an anchor or when connecting adjacent lengths of such strand, it is necessary to firmly and securely grip the center steel wire so that the same will assume most of the load and when this is done the outer wires can be clamped in a manner to provide for good electrical contact between the same and the connector, and also to assume their proportional share of the load.

Referring to Figure 1, the connector is shown as comprising a tubular housing or casing 12 of any suitable metal, having at least one end thereof tapered to form the tapering end portion 13. Said end portion is provided with an end opening 14 of reduced diameter compared with the size of the cylindrical portion of the casing. Located within the casing and more particularly within the tapering end portion thereof is a gripping member designated in its entirety by numeral 15 which is provided with sloping exterior surfaces for contacting the sloping walls of the end portion of the casing.

As more particularly shown in Figure 4, the gripping member comprises a member having segments 16 which result by reason of the longitudinal slots 17. The slots terminate short of the forward end 18 of the member and accordingly this end joins the segments together so that in effect they comprise a single one piece unit.

A bore or passage extends longitudinally of the member for receiving the wire or conductor as shown in Figure 1. The surface of the bore is smooth for a portion of the length thereof, as at 20, which portion includes the forward end 18. The remainder of the bore is provided with serrations or teeth 22. As regards the sloping surfaces of the gripping member, said surfaces, in accordance with the invention, may have a greater slope or taper than that of the interior surfaces of its respective end portion of the casing. This increases the compressibility of the rear of the member which, as shown in Figure 4, is formed with a cylindrical recess 23 having a diameter indicated by D.

As more particularly described and claimed in the copending application of Homer C. Nycum, Serial No. 174,004, filed November 11, 1937, the member 15 grips the outer wires of the strand with a graduated effect, which is a maximum at the rear of the segments, decreasing to zero where the serrations merge with the smooth portion 20 of the bore. It will be observed that the rear ends of the segments are free to be compressed radially inward by movement of the member forwardly within the tapering end portion of the casing and as a result of the tapering serrated surfaces 22, the said rear ends of the segments will effect a full bite of the teeth into the conductor. However, the teeth adjacent the forward end of the member do not bite into the conductor at all and between these two extremes the grip of the member on the conductor tapers off gradually both in depth and compression, giving the ideal grip and developing the maximum possible strength from a conductor, which results in the greatest factor of safety in service.

Before the strand 10 is inserted within the present connector the outer wires are cut back so as to terminate short of the center steel wire 11 which is gripped and held by the gripping wedges 24 provided with teeth or serrations 25. The wedges are located within a retainer 26, Figures 2 and 3, having longitudinal slots 27 extending inwardly from the front nose portion 28 for receiving said wedges. A bore extends completely through the retainer, the same having a diameter through the nose portion thereof somewhat larger than the wire 11, which, however, materially increases in diameter for the remainder of the member, providing a recess 30 for receiving the coil spring 31. The action of the coil spring is limited by the shoulder 32 and when the wedges are normally located within the retainer they just bear against the spring 31. The set screw 3 confines the coil spring 31 within the recess 30.

The cone 35, interposed between the wedge retainer and the gripping member, provides tapering surfaces 36 which conform substantially to the taper of the nose portion 28 of the retainer. When assembled the nose 28 is adapted to fit within the end of the cone so that the wedges 24 will have contact with the surfaces 36, it being understood that the coil spring 31 will yieldingly force the wedges in a direction to insure such contact. The forward end of cone 35 is formed with a cylindrical portion 37, having a diameter $d$ which is smaller than the diameter $D$ of the recess 23 in the gripping member by an amount which is approximately double the depth of the teeth or serrations 22 of the member.

When a conductor such as the wire strand 10 is inserted into the forward end 18 of the gripping members which project some distance beyond the casing 12, Figure 1, the gripping member and other parts including the cone 35 and the retainer 26 will be caused to travel rearwardly against the tension of the main coil spring 38. Travel of the conductor inwardly will cause the segments 16 of the gripping member to spring outwardly, which outward movement is radially assisted by the tension of the coil spring 38. The least possible resistance is thereby offered to an entering conductor and there is a minimum tendency for any of the wires of the strand to separate with the possibility of forcing them radially between the gripping segments. When the conductor has fully entered the member 15 the center steel wire thereof will have entered between the gripping members 24 which are forced forwardly into contact therewith by the coil spring 31.

When tension is applied to the conductor its movement in a direction outwardly is immediately prevented by the action of the gripping wedges 24 on the center wire, the gripping effect increasing as the tension on the conductor increases. The action of the member 15 is purposely delayed until the gripping wedges have taken hold and developed considerable stress in the center core. This delayed outer gripping action has been found necessary due to the possibility of differential movement longitudinally between the outer and the inner assemblies which will produce differential gripping action on the two line materials as their respective gripping means are taking hold and developing tension therein. As the wedges 24 are taking hold and getting set into the wire 11 the latter necessarily moves out of the wedge retainer slightly in this process, allowing the outer wires of the strand to also move outwardly and through the member 15. If the outer grip had taken prompt hold of the outer soft wires at the same time that the wedges take hold on the center wire, then the outer soft wires would be stressed unduly in proportion to the stress on the center core, resulting in their premature failure. Delayed outer grip action is accomplished by making the thickness T of the member 15 somewhat greater than the thickness required along this portion of the member when the same is used with conductors of uniform material. With the thickness T greater than would otherwise be the case more compression is required on the segments 16 of the member to initiate their bite. This added to the force of friction radially on the portion 37 of the cone can be made great enough to sufficiently set the wedges in the center steel wire and avoid any further harmful movement of this wire out of its gripping means. Further tension on the conductor will start compression of the segments to initiate their bite into the soft outer wires of the strand. It will be understood that proportions can be varied as preferred although the earlier stress on the center steel wire is desirable because the core material is harder, stronger and more elastic than the usual outer wire material.

It is further desirable in connectors of the present type to limit the amount of bite and compression applied to the soft material of the outer wires. This is effected in the present structure by making the cylindrical portion 37 of the cone somewhat smaller in diameter than that of the recess 23 which receives said portion. The difference between the two diameters is preferably about double the depth of the teeth or serrations of the grip member 15. This prevents excessive bite and compression on the softer material of the outer wires since radially inward movement of the rear end of the segments will be limited by contact of the walls 23 of the recess with the cylindrical portion 37 of the cone.

The invention is not to be limited to or by details of construction of the particular embodiment thereof illustrated by the drawing, as various other forms of the device will of course be apparent to those skilled in the art without departing from the spirit of the invention or the scope of the claims.

We claim:

1. A connecter for stranded wire conductors comprising a casing having a tapering end portion, a gripping member arranged within said tapering end portion and adapted to receive and grip the outer wires of a conductor, other gripping means located to the rear of said gripping member for gripping and holding the center wire of the conductor, said means including a cone-shaped member providing tapering surfaces, a plurality of wedges adapted to contact said tapering surfaces, a retainer for said wedges, and a coil spring within the casing having contact with said retainer to force the same and said cone-shaped member forwardly toward the gripping member.

2. A connecter for stranded wire conductors comprising a casing having a tapering end portion, a gripping member arranged within said tapering end portion and adapted to receive and grip the outer wires of a conductor, a cone-shaped member located to the rear of and adapted to contact said gripping member, a plurality of wedges located within said cone-shaped member and having contact with the tapering surfaces thereof, said wedges being adapted to grip and hold the center wire of the conductor, a retainer for said wedges, resilient means within the retainer operative to force the wedges into contact with the tapering surfaces of said cone-shaped member, and a coil spring within the casing having contact with said retainer to force the same and said cone-shaped member forwardly toward the gripping member.

3. A connecter for stranded wire conductors comprising a casing having a tapering end portion, a unitary gripping member within said end portion having sloping exterior surfaces conforming to and having contact with the tapering walls of said portion, said member having a longitudinal bore extending therethrough for receiving a conductor and comprising segments united at the forward end of the member and having serrations on their inside surface, whereby only the rear portion of each segment is free to be compressed to bite into the outer wires of the conductor extending through the bore, wedge members within the casing to the rear of the unitary gripping member for gripping and holding the center wire of the conductor, and a cone member housing said wedge members, the front end of said cone member having location within a recess formed in the rear of the gripping member to thereby limit radial inward movement of the rear end of said segments to prevent excessive bite and compression of the gripping member on the outer wires of the conductor.

4. A connecter for stranded wire conductors comprising a casing having a tapering end portion, a unitary gripping member within said end portion having sloping exterior surfaces conforming to and having contact with the tapering walls of said portion, said member having a longitudinal bore extending therethrough for receiving a conductor and comprising segments united at the forward end of the member and having serrations on their inside surface, whereby only the rear portion of each segment is free to be compressed to bite into the outer wires of the conductor extending through the bore, wedge members within the casing to the rear of the unitary gripping member for gripping and holding the center wire of the conductor, and a cone member housing said wedge members, the exterior of said unitary gripping member having a greater taper than the end portion of the casing, whereby the compressibility of the rear of the segments is increased and the bite of said segments on the conductor is concentrated at the rear portion thereof.

ARTHUR A. BERNDT.
HOMER C. NYCUM.